United States Patent
Kroeger et al.

(10) Patent No.: US 9,106,472 B1
(45) Date of Patent: Aug. 11, 2015

(54) CHANNEL STATE INFORMATION (CSI) ESTIMATION AND APPLICATIONS FOR IN-BAND ON-CHANNEL RADIO RECEIVERS

(71) Applicant: iBiquity Digital Corporation, Columbia, MD (US)

(72) Inventors: Brian W. Kroeger, Sykesville, MD (US); Paul J. Peyla, Elkridge, MD (US)

(73) Assignee: iBiquity Digital Corporation, Columbia, MD (US)

( * ) Notice: Subject to any disclaimer, the term of this patent is extended or adjusted under 35 U.S.C. 154(b) by 0 days.

(21) Appl. No.: 14/316,852

(22) Filed: Jun. 27, 2014

(51) Int. Cl.
*H04L 25/06* (2006.01)
*H04L 25/03* (2006.01)
*H04B 1/00* (2006.01)
*H04B 1/10* (2006.01)

(52) U.S. Cl.
CPC .............. *H04L 25/06* (2013.01); *H04B 1/0039* (2013.01); *H04B 1/10* (2013.01); *H04L 25/03* (2013.01)

(58) Field of Classification Search
CPC ...................................................... H04B 1/005
USPC .......................................................... 375/340
See application file for complete search history.

(56) References Cited

U.S. PATENT DOCUMENTS

| | | | |
|---|---|---|---|
| 5,140,615 A * | 8/1992 | Jasper et al. | 375/347 |
| 6,317,470 B1 | 11/2001 | Kroeger et al. | |
| 7,724,850 B2 | 5/2010 | Kroeger et al. | |
| 7,933,368 B2 | 4/2011 | Peyla et al. | |
| 2013/0070821 A1 * | 3/2013 | Lai et al. | 375/219 |

* cited by examiner

*Primary Examiner* — Lihong Yu
(74) *Attorney, Agent, or Firm* — Robert P. Lenart, Esq.; Pietragallo Gordon Alfano Bosick & Raspanti, LLP

(57) ABSTRACT

A method is provided for estimating channel state information in an in-band on-channel radio signal including a plurality of digitally modulated reference subcarriers. The method includes: receiving symbols transmitted on the reference subcarriers; combining the reference subcarrier symbols with a known reference sequence conjugate to produce a plurality of samples; median filtering the samples to produce filtered samples; smoothing the samples for each of the reference subcarriers over the plurality of reference subcarriers to produce a complex channel gain estimate for each of the subcarriers; and using a bias correction function to compensate for estimation bias error in the complex channel gain estimate due to the median filtering. Receivers that implement the method are also provided.

20 Claims, 10 Drawing Sheets

CHANNEL STATE INFORMATION (CSI) ESTIMATION AND APPLICATIONS FOR IN-BAND ON-CHANNEL RADIO RECEIVERS

FIELD OF THE INVENTION

This invention relates to methods and apparatus for receiving and processing in-band, on-channel radio signals, and more particularly to methods and apparatus for estimating channel state information.

BACKGROUND OF THE INVENTION

The iBiquity Digital Corporation HD Radio™ system is designed to permit a smooth evolution from current analog amplitude modulation (AM) and frequency modulation (FM) radio to a fully digital in-band on-channel (IBOC) system. This system delivers digital audio and data services to mobile, portable, and fixed receivers from terrestrial transmitters in the existing medium frequency (MF) and very high frequency (VHF) radio bands.

IBOC signals can be transmitted in a hybrid format including an analog modulated carrier in combination with a plurality of digitally modulated subcarriers, or in an all-digital format wherein the analog modulated carrier is not used. Using the hybrid format, broadcasters may continue to transmit analog AM and FM simultaneously with higher-quality and more robust digital signals, allowing themselves and their listeners to convert from analog to digital radio while maintaining their current frequency allocations. IBOC hybrid and all-digital waveforms are described in U.S. Pat. No. 7,933,368, which is hereby incorporated by reference.

Channel State Information (CSI) is useful in the decoding of digital signals in radio receivers. CSI as a signal-to-noise ratio (SNR) conveys the reliability of the associated digital symbols; while the estimation of channel gain, magnitude, and phase allows the demodulator to remove or compensate for them. Accurate and timely CSI estimation is important to maximize reliable decoding performance.

It is desirable to improve the accuracy and timeliness of the CSI estimation for HD Radio receivers.

SUMMARY

A first embodiment encompasses a method for estimating channel state information in an in-band on-channel radio signal including a plurality of digitally modulated reference subcarriers. The method includes: receiving symbols transmitted on the reference subcarriers; combining the reference subcarrier symbols with a known reference sequence conjugate to produce a plurality of samples; median filtering the samples to produce filtered samples; smoothing the samples for each of the reference subcarriers over the plurality of reference subcarriers to produce a complex channel gain estimate for each of the subcarriers; and using a bias correction function to compensate for estimation bias error in the complex channel gain estimate due to the median filtering.

Another embodiment encompasses a receiver for an in-band on-channel radio signal including a plurality of digitally modulated reference subcarriers. The receiver includes an input for receiving symbols transmitted on the reference subcarriers; and processing circuitry for estimating channel state information, the processing circuitry being configured to combine the reference subcarrier symbols with a known reference sequence conjugate to produce a plurality of samples; median filter the samples to produce filtered samples; smooth the samples for each of the reference subcarriers over the plurality of reference subcarriers to produce a complex channel gain estimate for each of the subcarriers; and use a bias correction function to compensate for estimation bias error in the complex channel gain estimate due to the median filtering.

DETAILED DESCRIPTION

The following description describes various embodiments of methods and apparatus that provide improved Channel State Information (CSI) estimation in IBOC radio systems. Improvements include correcting for bias error in estimation of channel gain and noise variance. These improvements can provide improved carrier-to-noise-density ratio (Cd/No) and digital signal quality metrics for blending, diversity switching, and channel scanning in mobile environments, while reducing processing requirements.

Figure 1:
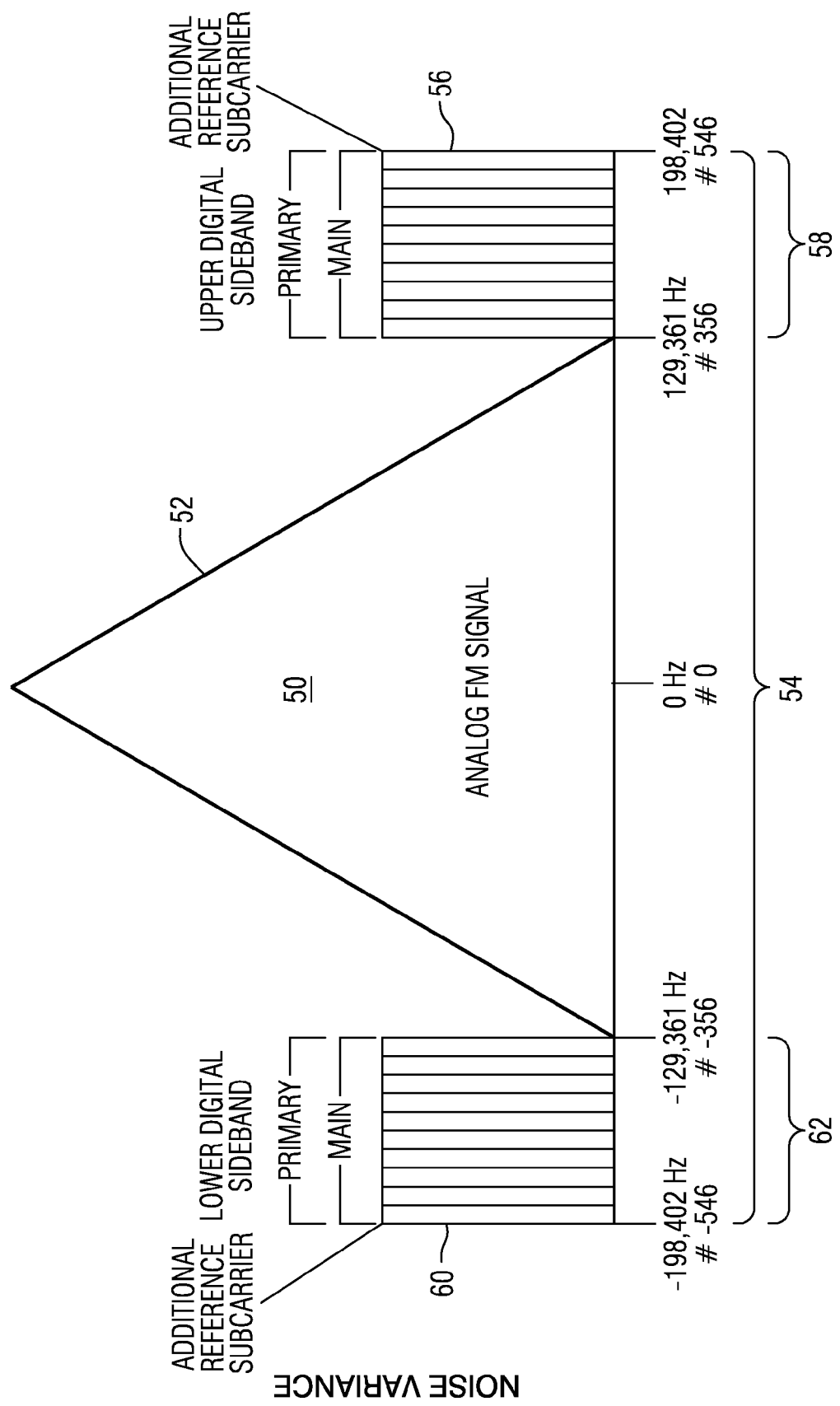
FIG. 1 is a schematic representation of the spectrum of the Hybrid Waveform to which this invention can be applied.

FIG. 1 is a schematic representation of the spectrum of the hybrid FM IBOC waveform 50 to which this invention can be applied. The waveform includes an analog modulated signal 52 located in the center of a broadcast channel 54, a first plurality of evenly spaced orthogonally frequency division multiplexed subcarriers 56 in an upper sideband 58, and a second plurality of evenly spaced orthogonally frequency division multiplexed subcarriers 60 in a lower sideband 62. The digitally modulated subcarriers are broadcast at a lower power level than the analog modulated carrier to comply with required channel signal masks. The digitally modulated subcarriers are divided into partitions and various subcarriers are designated as reference subcarriers. A frequency partition is a group of 19 OFDM subcarriers containing 18 data subcarriers and one reference subcarrier.

The hybrid waveform includes an analog FM-modulated signal, plus digitally modulated Primary Main subcarriers. The digital signal is transmitted in Primary Main (PM) sidebands on both sides of the analog FM signal in the hybrid waveform. The power level of each sideband is appreciably below the total power in the analog FM signal. The analog signal may be monophonic or stereo, and may include Subsidiary Communications Authorization (SCA) channels.

The subcarriers are located at evenly spaced frequency locations. The subcarrier locations are numbered from −546 to +546. In the waveform of FIG. 1, the subcarriers are at locations +356 to +546 and −356 to −546. This waveform will normally be used during an initial transitional phase preceding conversion to the all-digital waveform.

Each primary main sideband is comprised of ten frequency partitions, which are allocated among subcarriers 356 through 545, or −356 through −545. Subcarriers 546 and −546, also included in the primary main sidebands, are additional reference subcarriers. The amplitude of each subcarrier can be scaled by an amplitude scale factor.

In the hybrid waveform, the digital signal is transmitted in Primary Main (PM) sidebands on either side of the analog FM signal. The power level of each sideband is appreciably below the total power in the analog FM signal. The analog signal may be monophonic or stereo, and may include subsidiary communications authorization (SCA) channels.

Figure 2:
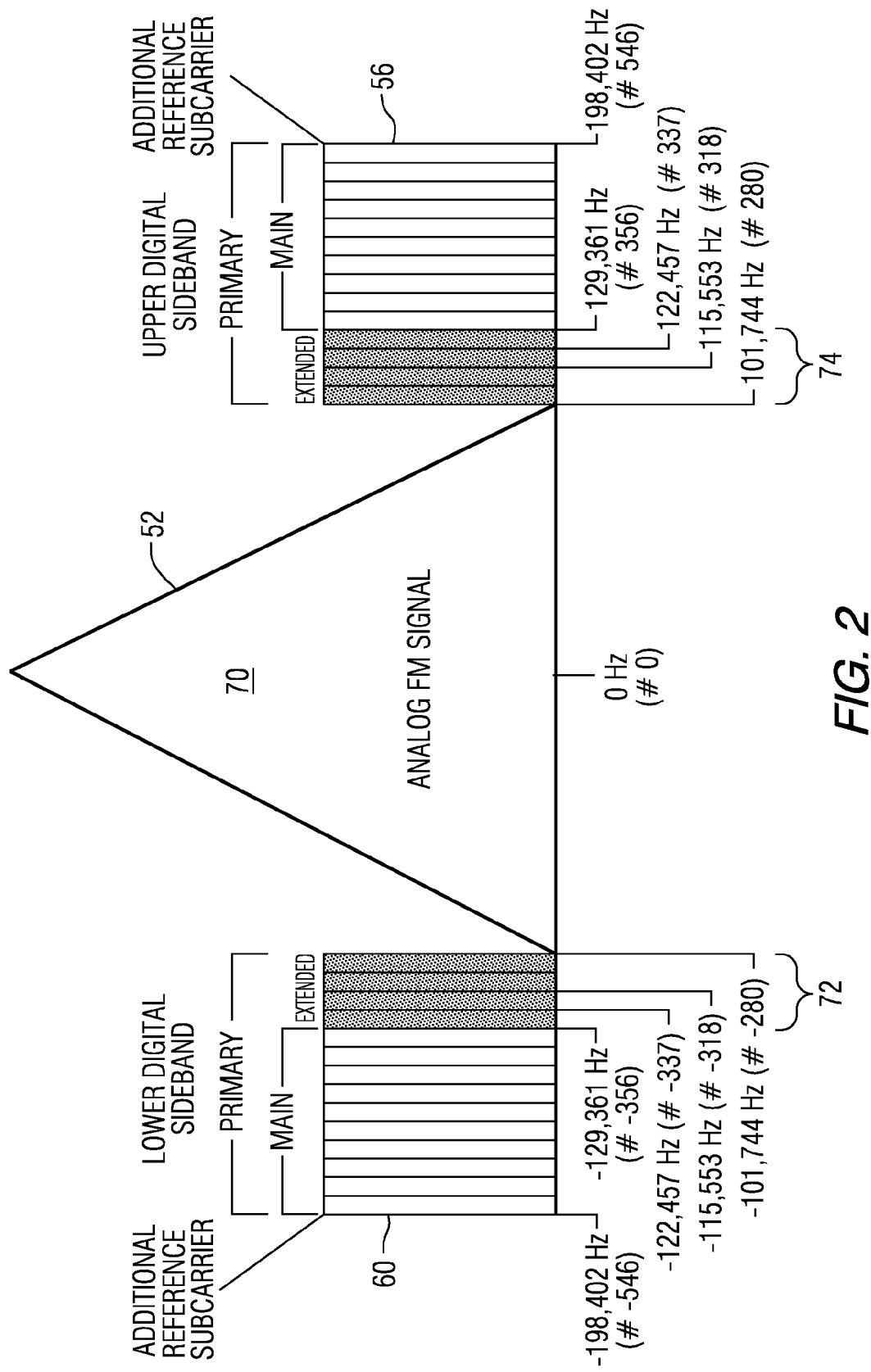
FIG. 2 is a schematic representation of the spectrum of the Extended Hybrid Waveform to which this invention can be applied.

FIG. 2 is a schematic representation of the spectrum of the extended hybrid waveform to which this invention can be applied. In the extended hybrid waveform, the bandwidth of the hybrid sidebands can be extended toward the analog FM signal to increase digital capacity. This additional spectrum, allocated to the inner edge of each Primary Main sideband, is termed the Primary Extended (PX) sideband.

The extended hybrid waveform is created by adding Primary Extended sidebands to the Primary Main sidebands present in the hybrid waveform, as shown in FIG. 2. Depending on the service mode, one, two, or four frequency partitions can be added to the inner edge of each Primary Main sideband.

FIG. 2 is a schematic representation of an extended hybrid FM IBOC waveform 70. The extended hybrid waveform is created by adding primary extended sidebands 72, 74 to the primary main sidebands present in the hybrid waveform. Depending on the service mode, one, two, or four frequency partitions can be added to the inner edge of each primary main sideband.

The extended hybrid waveform includes the analog FM signal plus digitally modulated primary main subcarriers (subcarriers +356 to +546 and −356 to −546) and some or all primary extended subcarriers (subcarriers +280 to +355 and −280 to −355). This waveform will normally be used during an initial transitional phase preceding conversion to the all-digital waveform.

Each primary main sideband includes ten frequency partitions and an additional reference subcarrier spanning subcarriers 356 through 546, or −356 through −546. The upper primary extended sidebands include subcarriers 337 through 355 (one frequency partition), 318 through 355 (two frequency partitions), or 280 through 355 (four frequency partitions). The lower primary extended sidebands include subcarriers −337 through −355 (one frequency partition), −318 through −355 (two frequency partitions), or −280 through −355 (four frequency partitions). The amplitude of each subcarrier can be scaled by an amplitude scale factor.

Figure 3:
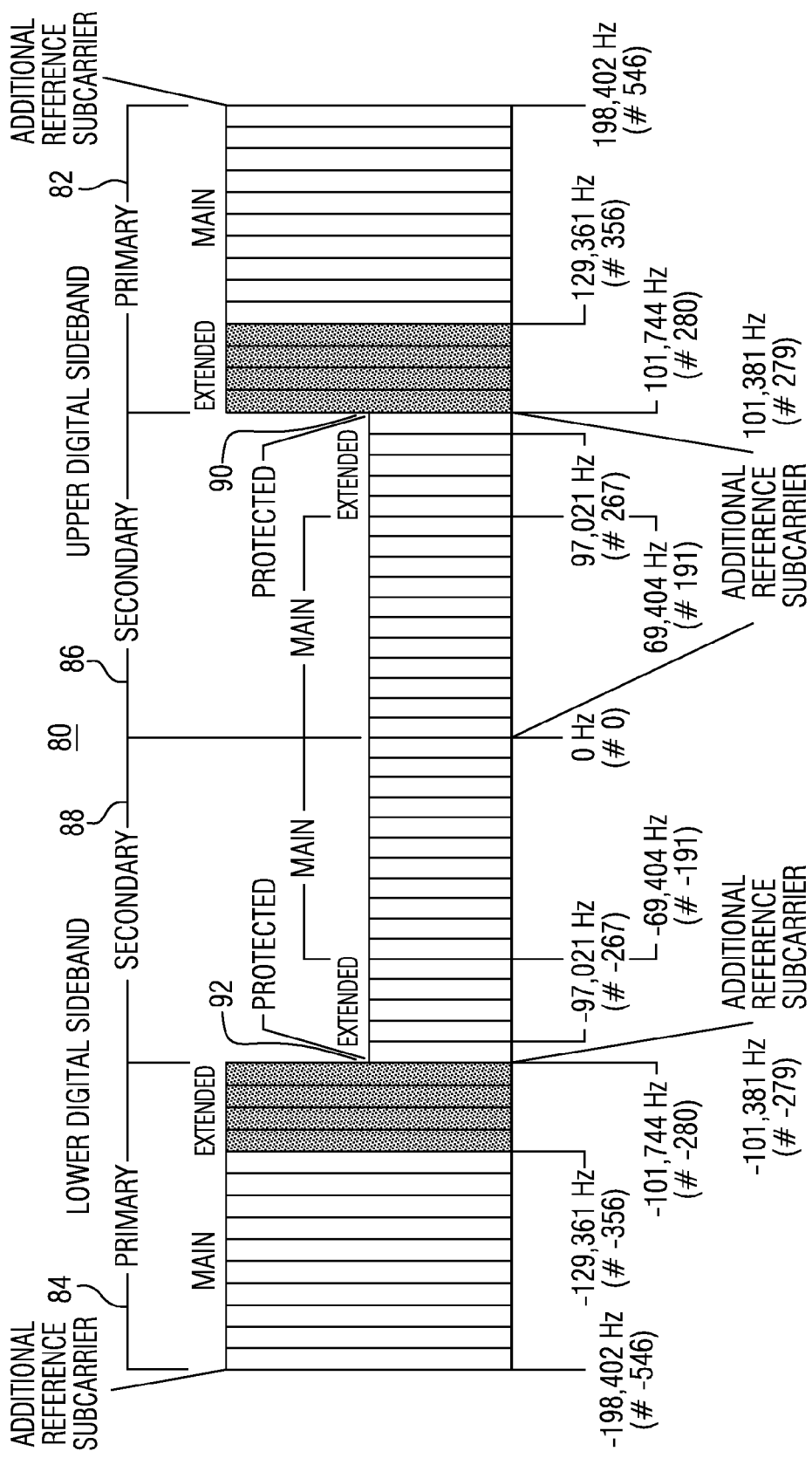
FIG. 3 is a schematic representation of the spectrum of the All-Digital Waveform to which this invention can be applied.

FIG. 3 is a schematic representation of the spectrum of the all-digital waveform to which this invention can be applied. FIG. 3 is a schematic representation of an all-digital FM IBOC waveform 80. The all-digital waveform is constructed by disabling the analog signal, fully expanding the bandwidth of the primary digital sidebands 82, 84, and adding lower-power secondary sidebands 86, 88 in the spectrum vacated by the analog signal. The all-digital waveform in the illustrated embodiment includes digitally modulated subcarriers at subcarrier locations −546 to +546, without an analog FM signal.

In addition to the ten main frequency partitions, all four extended frequency partitions are present in each primary sideband of the all-digital waveform. Each secondary sideband also has ten Secondary Main (SM) and four Secondary Extended (SX) frequency partitions. Unlike the primary sidebands, however, the Secondary Main frequency partitions are mapped nearer to channel center with the extended frequency partitions farther from the center.

Each secondary sideband also supports a small Secondary Protected (SP) region 90, 92 including 12 OFDM subcarriers and reference subcarriers 279 and −279. The sidebands are referred to as "protected" because they are located in the area of spectrum least likely to be affected by analog or digital interference. An additional reference subcarrier is placed at the center of the channel (0). Frequency partition ordering of the SP region does not apply since the SP region does not contain frequency partitions.

Each Secondary Main sideband spans subcarriers 1 through 190 or −1 through −190. The upper Secondary Extended sideband includes subcarriers 191 through 266, and the upper Secondary Protected sideband includes subcarriers 267 through 278, plus additional reference subcarrier 279. The lower Secondary Extended sideband includes subcarriers −191 through −266, and the lower Secondary Protected sideband includes subcarriers −267 through −278, plus additional reference subcarrier −279. The total frequency span of the entire all-digital spectrum is 396,803 Hz. The amplitude of each subcarrier can be scaled by an amplitude scale factor. The secondary sideband amplitude scale factors can be user selectable. Any one of the four may be selected for application to the secondary sidebands.

All three waveform types conform to the currently allocated spectral emissions mask. The digital signal is modulated using orthogonal frequency division multiplexing (OFDM). OFDM is a parallel modulation scheme in which the data stream modulates a large number of orthogonal subcarriers, which are transmitted simultaneously. OFDM is inherently flexible, readily allowing the mapping of logical channels to different groups of subcarriers.

Figure 4:
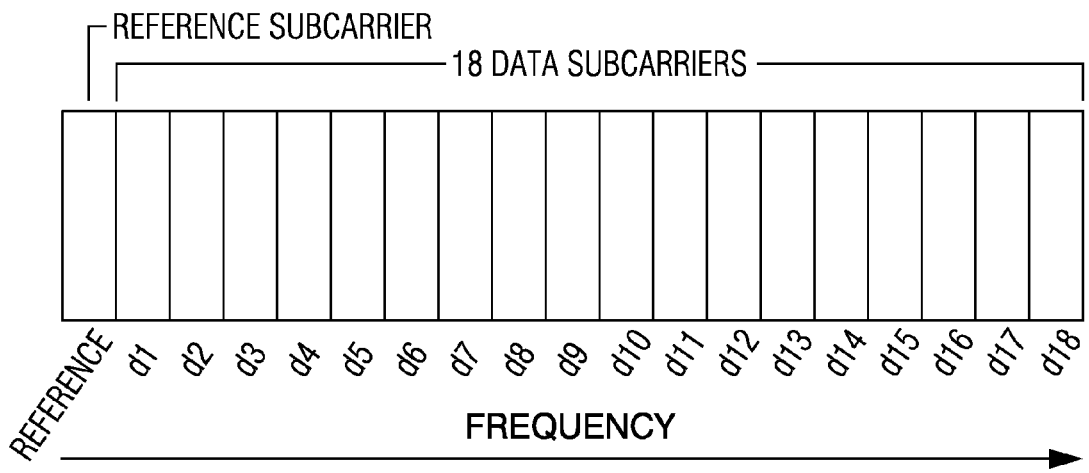
FIG. 4 is a schematic representation of a first type of Frequency Partition-Ordering.
Figure 5:
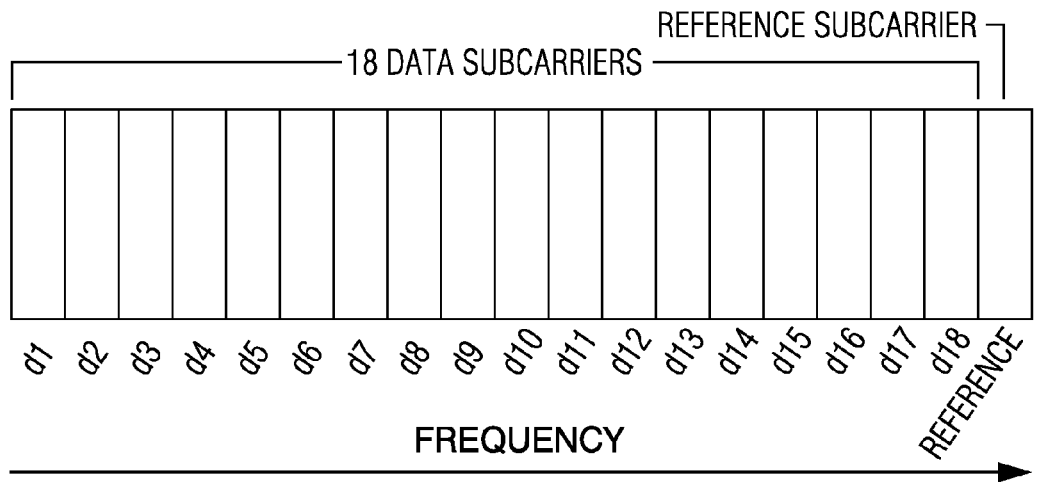
FIG. 5 is a schematic representation of a second type of Frequency Partition-Ordering.

The OFDM subcarriers are assembled into frequency partitions. FIG. 4 is a schematic representation of a first type of Frequency Partition-Ordering. FIG. 5 is a schematic representation of a second type of Frequency Partition-Ordering. Each frequency partition consists of eighteen data subcarriers and one reference subcarrier, as shown in FIG. 4 (ordering A) and FIG. 5 (ordering B). The position of the reference subcarrier (ordering A or B) varies with the location of the frequency partition within the spectrum.

Figure 6:
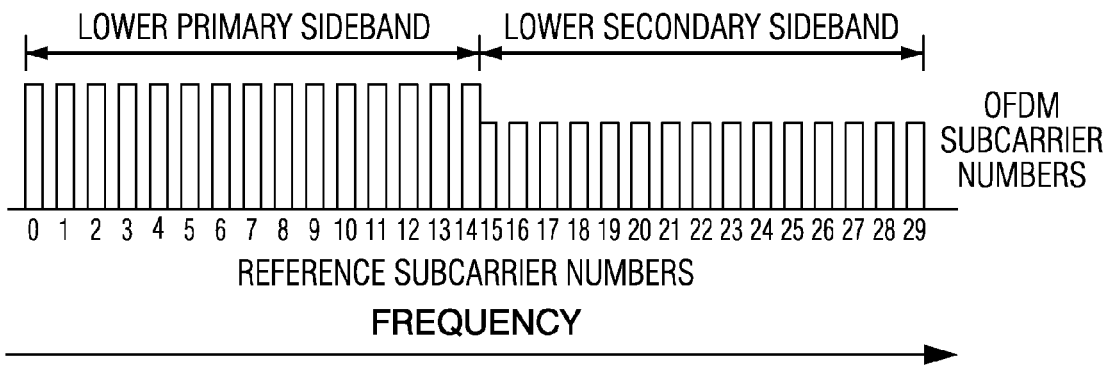
FIG. 6 is a schematic representation of Lower Sideband Reference Subcarrier Spectral Mapping.
Figure 7:
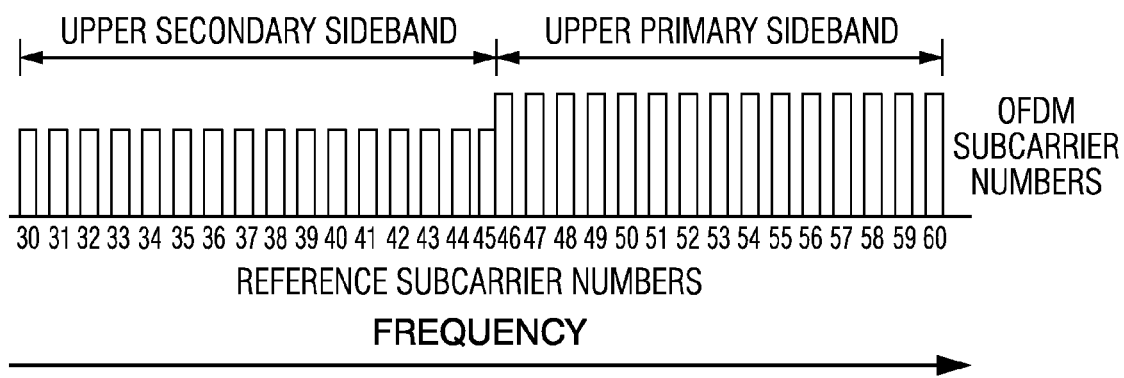
FIG. 7 is a schematic representation of Upper Sideband Reference Subcarrier Spectral Mapping.

Besides the reference subcarriers resident within each frequency partition, depending on the service mode, up to five additional reference subcarriers are inserted into the spectrum at subcarrier numbers −546, −279, 0, 279, and 546. The overall effect is a regular distribution of reference subcarriers throughout the spectrum. For notational convenience, each reference subcarrier is assigned a unique identification number between 0 and 60. All lower sideband reference subcarriers are shown in FIG. 6. All upper sideband reference subcarriers are shown in FIG. 7. The figures indicate the relationship between reference subcarrier numbers and OFDM subcarrier numbers.

FIGS. 1-3 show the subcarrier number and center frequency of certain key OFDM subcarriers. The center frequency of a subcarrier is calculated by multiplying the subcarrier number by the OFDM subcarrier spacing Δf. The center of subcarrier 0 is located at 0 Hz. In this context, center frequency is relative to the Radio Frequency (RF) allocated channel. For example, the upper Primary Main sideband is bounded by subcarriers 356 and 546, whose center frequencies are located at 129,361 Hz and 198,402 Hz, respectively. The frequency span of the Primary Main sideband is 69,041 Hz (198,402-129,361).

Figure 8:
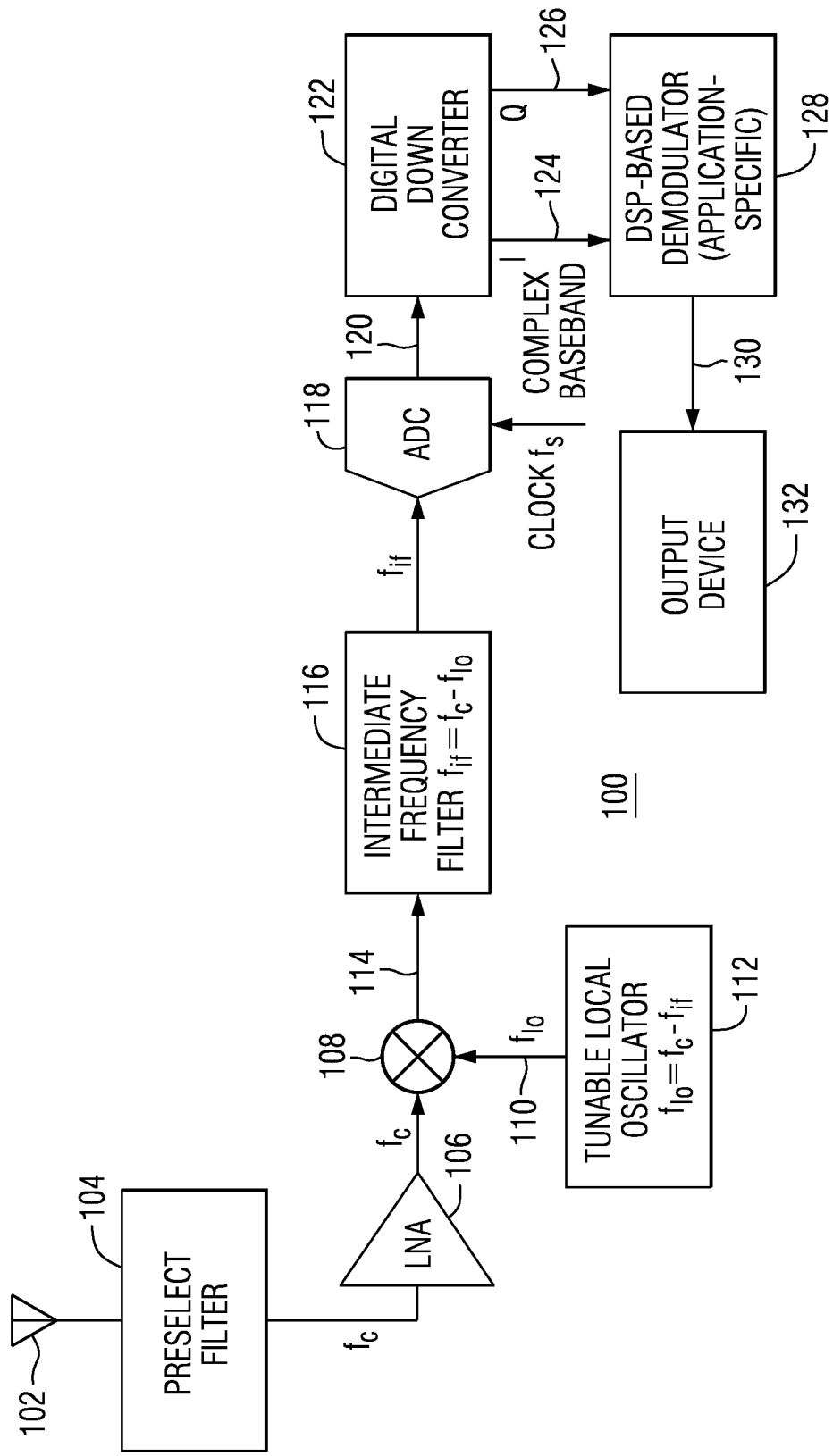
FIG. 8 is a block diagram of a receiver that can process signals in accordance with an embodiment of this invention.

FIG. 8 is a block diagram of a receiver 100 that can process IBOC radio signals in accordance with an embodiment of this invention. In this embodiment, an HD Radio™ signal is received on antenna 102. A bandpass preselect filter 104 passes the frequency band of interest, including the desired signal at frequency $f_c$, but rejects the image signal at ($f_c-2f_{if}$) (for a low sideband injection local oscillator). Low noise amplifier 106 amplifies the signal. The amplified signal is mixed in mixer 108 with a local oscillator signal $f_{lo}$ supplied on line 110 by a tunable local oscillator 112. This creates sum ($f_c+f_{lo}$) and difference ($f_c-f_{lo}$) signals on line 114. Intermediate frequency filter 116 passes the intermediate frequency signal $f_{if}$ and attenuates frequencies outside of the bandwidth of the modulated signal of interest. An analog-to-digital converter 118 operates using a clock signal $f_s$ to produce digital samples on line 120 at a rate $f_s$. Digital down converter 122 frequency shifts, filters and decimates the signal to produce lower sample rate in-phase and quadrature signals on lines 124 and 126. A digital signal processor 128 then provides additional signal processing, including the coherent tracking described above, to produce an output signal on line 130 for output device 132.

Channel State Information (CSI) is useful in the decoding of digital signals such as those of an IBOC radio signal. CSI can be used to estimate channel magnitude and phase. This can be accomplished by developing a phase reference for coherent demodulation, weighting demodulated soft decisions based on the channel state for subsequent Viterbi decoding, and developing a SNR metric to convey the reliability of digital signals.

Figure 9:
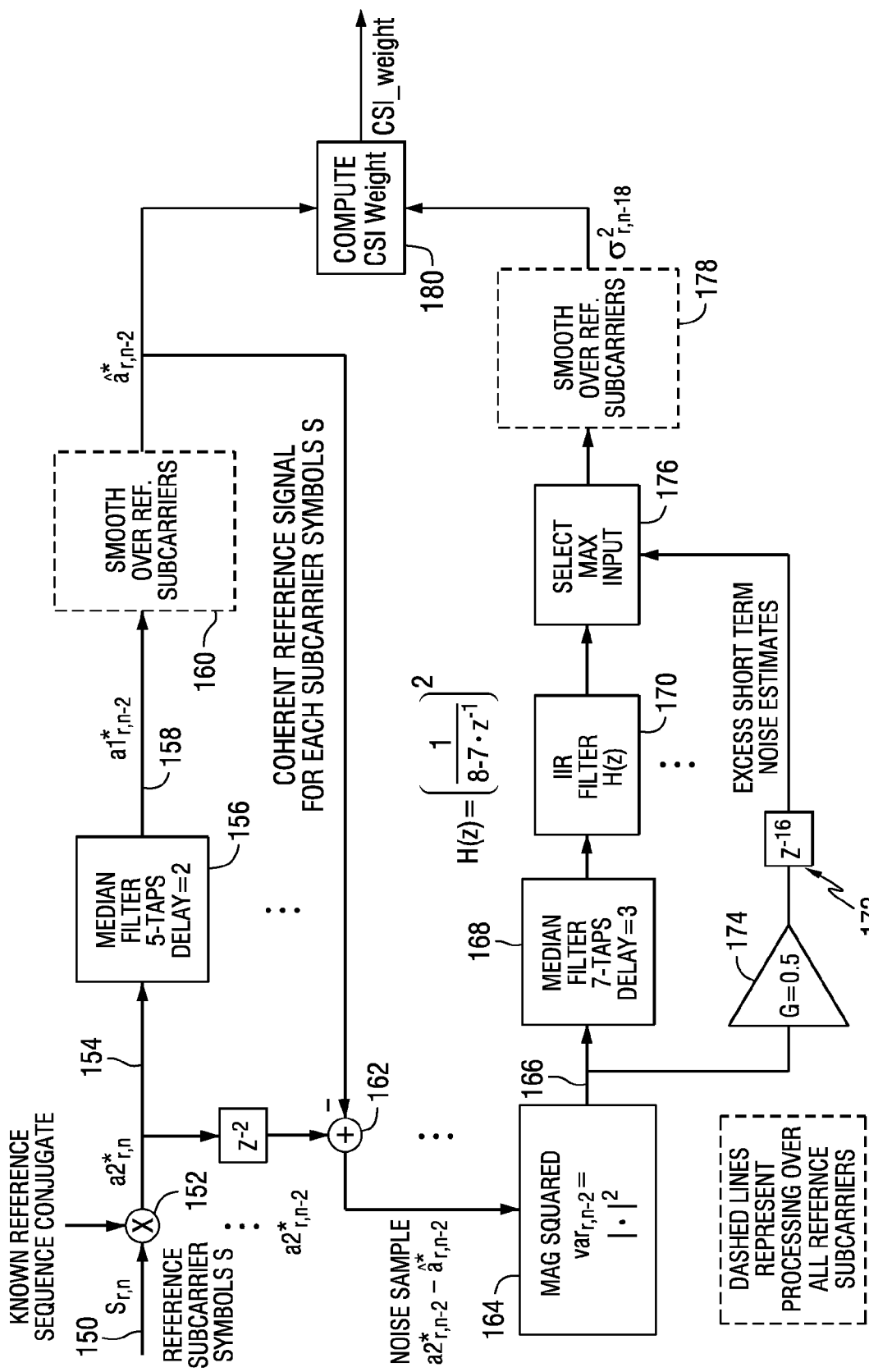
FIG. 9 is a block diagram of a reference and noise estimation process.

A functional diagram of coherent reference and noise estimation processing is shown in FIG. 9. The functions and algorithms of FIG. 9 provide estimates of the coherent channel complex (conjugate) gain (â*) along with estimates of the noise variance ($\sigma^2$) or interference. These estimates are local in time and frequency (subcarrier location) to accommodate the dynamic selective fading channel experience in a mobile environment such as a moving automobile. These estimates are derived from the reference subcarrier symbols which have been stripped from the received and demodulated signal, and are input on line 150 as $S_{r,n}$ complex values. The data used to modulate these symbols is already known and removed from these symbols with the first conjugate multiply operation (illustrated by multiplier 152) to yield the instantaneous complex channel gain values $a2_{r,n}$ on line 154. The subsequent median filtering 156 in time reduces the noise while maintaining the step changes due to antenna switching to produce intermediate values $a1_{r,n}$ on line 158. These intermediate values are further filtered (smoothed) over the reference subcarriers (in frequency) as shown in block 160 to produce the final complex channel gain values $a_{r,n}$. These $a_{r,n}$ gain values are later used outside this algorithm to process (equalize and provide branch metric information) the signal constellations for the data-bearing symbols in the conventional manner for QAM symbol demodulation.

The next step in this process is to estimate the noise associated with each of these complex channel gain values. The instantaneous noise samples are estimated by subtracting the $a_{r,n-2}$ values from the (appropriately delayed) noisy corresponding input samples $a2_{r,n-2}$, as illustrated by summation point 162. As shown in block 164, the magnitude-squared value is computed from these complex noise samples to yield the instantaneous noise variance estimates $var_{n-2}$ on line 166. These instantaneous noise variance samples are poor estimates of the local (time and frequency) noise and require processing and filtering to produce useful noise variance estimates. Although simpler time and frequency filtering would normally be used to reduce the error of these instantaneous noise variance estimates, this type of filtering would not effectively accommodate the changing noise due to fading, AGC action and step changes due to antenna switching. Therefore a median filter 168 is used to filter these instantaneous variance samples in time to produce samples $varfit_{n-16}$, and conventional (linear IIR or FIR filter 170) filtering is used to further smooth across frequency (subcarriers) to produce the final variance estimates $\sigma^2_{r,n-18}$ in a manner similar to the complex channel gain estimates above. An additional feed forward path 172 is provided to capture the relatively large noise impulses that occur due to the antenna switching. When these values (scaled by a factor 0.5 as shown in block 174) exceed the median-filtered estimate, then these larger values are selected for output to the frequency smoothing filter by the select max function illustrated in block 176. These values are then smoothed over the reference subcarriers as shown in block 178. This is important in subsequent formation of the branch metrics which exploits this knowledge of the large noise impulses.

SNR Bias Correction

The previously existing CSI-weight estimate described above tends to overestimate the SNR, especially in noisy environments. There are several sources contributing to this bias error. They include an additive bias term for the signal gain â*, and two multiplicative bias factors in estimating the noise variance $\sigma^2$. In the diagram of FIG. 9, the bias errors are corrected in block 180, labeled "Compute SI Weight". Methods for correction of the bias errors are described herein. These bias errors are analyzed in the following sections, starting with the channel gain estimation error.

Channel Gain Estimation Error

The complex channel gain estimate â includes a noise component in addition to the signal (if any). For example, the mean value of the channel gain can be expected to be zero when there is no signal present. However in practice, the mean value of the noise over the finite filter span is generally nonzero. That is, the CSI weight is not generally zero when there is no signal. This inaccuracy can be compensated by a bias-correction function. The estimated value of the magnitude-squared channel gain a is increased by the variance of the residual noise of the reference-subcarrier symbols after filtering. The input noise $\sigma^2$ is reduced by a factor $r_a$ due to the median filter and filtering over the reference subcarriers in the final estimate of â. The expected value of the biased magnitude-squared channel gain is:

$$|â|^2=|a|^2+r_a\cdot\sigma^2$$

In the notation used in this description, a superscript asterisk identifies the complex conjugate of a. The "hat" over the a indicates that it is only an estimate of a (possibly biased).

The bias can be corrected by solving for the unbiased $|a|^2$.

$$|a|^2=|â|^2-r_a\cdot\sigma^2$$

The expression above for the bias-corrected magnitude-squared channel gain is a function of its biased estimate, the noise variance reduction factor $r_a$, and the actual unbiased noise variance.

The combination of the 5-tap median filter and the finite impulse response (FIR) filter that is used to smooth across the reference subcarriers results in the variance reduction factor $r_a$. In one embodiment, the ratio of the noise variance of the filter output samples to the noise variance of the input samples of the 5-tap complex median filter is approximately 0.286 (−5.44 dB). This assumes a constant gain parameter a over the filter span, and corruption by additive white Gaussian noise (AWGN). In this embodiment, the filter used to smooth the estimates across the reference subcarriers has 9 taps which are normalized such that their sum is unity, yielding a dc gain of one.

$$\text{coef} = \frac{1}{256} \cdot (1\ 8\ 28\ 56\ 70\ 56\ 28\ 8\ 1)^T$$

The variance reduction for this FIR filter is equal to the sum of the squares of the normalized filter coefficients, $$\sum_n \text{coef}_n^2.$$

The variance reduction for this filter is approximately 0.196 or about −7.07 dB. The composite variation reduction for the 5-tap complex median filter and the 9-tap FIR filter is approximately $r_a$=0.056 (−12.5 dB). However the estimate of the noise variance used in current receiver implementations is also biased, and must be corrected for use in the previous expressions. This is discussed below.

Noise Variance Estimation Error

The noise variance estimation process measures the noise variance about the median of the samples, not the mean. So it is useful to relate the actual noise variance to the estimated noise variance using the technique shown in FIG. 9.

Median Filter Characteristics

The 7-tap median filter is used to preprocess the noise-squared samples prior to linear IIR filtering and filtering over frequency (reference subcarriers). In this case, the median filter produces a biased estimate of the variance due to the asymmetric probability density function (PDF) of the noise-squared samples. This bias can be adjusted for subsequent operation in the noise-estimation process. Specifically, each complex input sample x to the median filter is assumed to consist of the sum of a pair (I and Q) of squares of zero-mean Gaussian noise samples, where $x=v^2+w^2$. This is a Chi-Square distribution with 2 degrees of freedom. The Gaussian PDFs of noise samples u and v are:

$$p(u) = p(v) = \frac{\exp\{-v^2/2\sigma^2\}}{\sigma\sqrt{2\pi}}; \quad p(u,v) = \frac{\exp\{-(u^2+v^2)/2\sigma^2\}}{2\pi\sigma^2}.$$

The cumulative distribution function of the Chi-Square distribution x can be found with a change of variables and integrating as follows:

$$P(x) = \iint_{u^2+v^2 \le x} p(u,v) \cdot du \cdot dv = 1 - \exp\{-x/2\sigma^2\}.$$

Then the PDF of x is found from differentiation of P(x).

$$p(x) = \frac{\exp\{-x/2\sigma^2\}}{2\sigma^2}; \text{ for } x \ge 0.$$

The noise variance is defined as the mean of x.

$$\sigma_x^2 = \frac{1}{2\sigma^2} \int_0^\infty x \cdot \exp\{-x/2\sigma^2\} dx = 2\sigma^2.$$

The median of x can be found by solving for medx in the following equation:

$$\frac{1}{2\sigma^2} \int_0^{medx} \exp\{-x/2\sigma^2\} dx = \frac{1}{2\sigma^2} \int_{medx}^\infty \exp\{-x/2\sigma^2\} dx$$

$$\exp\{-x/2\sigma^2\}|_0^{medx} = \exp\{-x/2\sigma^2\}|_{medx}^\infty$$

$$\exp\{-medx/2\sigma^2\} - 1 = -\exp\{-medx/2\sigma^2\}$$

$$\exp\{-medx/2\sigma^2\} = 1/2$$

$$medx = 2\sigma^2 \cdot \ln(2)$$

A linear FIR filter estimates the mean of the input signal; however, the estimation bias factor of the median filter, because of the asymmetric PDF, is found as the ratio of the median to the mean.

$$\text{med\_bias} = \frac{medx}{\sigma_x^2} = \frac{2\sigma^2 \cdot \ln(2)}{2\sigma^2} = \ln(2) \cong 0.693.$$

Therefore, the median underestimates the Gaussian noise variance by a factor of ln(2). This bias should be accounted for when used to replace the mean estimate in the noise-variance estimation process.

Scaling of the noise estimate due to the median bias factor would not generally be an issue if all the noise estimates for all the symbols presented to the Viterbi decoder were scaled by the same factor. However, the feed-forward excess noise estimate path is just one example where the scaling does matter. Furthermore, nonlinearities in forming the branch metrics (e.g., fixed-point quantization and overflow) may also have an effect IIR Filter Characteristics The characteristics of the IIR filter in the variance estimation process are discussed next. This IIR filter is used to reduce the estimation noise of the median filter; however, the median value or scaling is not affected. Each output sample $y_n$ of the 2-pole IIR lossy integrator filter is a function of the new input sample $x_n$ and the 2 previous outputs.

$$y_n = \beta^2 \cdot x_n + 2 \cdot (1-\beta) \cdot y_{n-1} - (1-\beta)^2 \cdot y_{n-2}.$$

The filter expression has a dc gain of one, and its impulse response (time) depends upon the parameter β.

The delay of this filter must be determined to properly delay the excess-noise path. The peak of the impulse response (mode) occurs in half the time of the group delay, where the group delay is more indicative of the step-response time. The mean and mode delays can be computed as a function of parameter β. The effective delay of the filter should be at least the mode delay, but not more than the group delay. This delay should be appropriately compensated when applying the noise estimates in forming the branch metrics.

$$\text{group\_delay} = \text{mean\_delay} = 2 \cdot \left(\frac{1}{\beta} - 1\right)$$

$$\text{mode\_delay} = \frac{1}{\beta} - 1$$

For a value of β=⅛ group_delay=14 and mode_delay=7. A value of 13 is used here.

The Gaussian-noise suppression ability can be assessed in a manner similar to the FIR filter, where the variance reduction of the noise estimate from input to output is equal to the sum of the squares of the normalized filter coefficients (dc gain=1). Note that this variance reduction is associated with the error variance of the estimate of the noise variance, and not a reduction of the variance of the noise power. For the IIR filter, having virtually an infinite number of equivalent FIR coefficients, this computation is more conveniently performed on the z-transform of the filter impulse response, taking the limit for large N approaching a continuous spectrum, then applying Parseval's theorem. Substituting $z = e^{j \cdot 2 \cdot \pi \cdot n/N}$ into the z-transform of the IIR filter yields:

$$H(n, \beta) = \frac{\beta^2}{1 - 2 \cdot (1-\beta) \cdot e^{-j \cdot 2 \cdot \pi \cdot n/N} + (1-\beta)^2 \cdot e^{-j \cdot 4 \cdot \pi \cdot n/N}},$$

and its magnitude is:

$$|H(n, \beta)| = \frac{\beta^2}{2 - 2 \cdot \beta + \beta^2 - 2 \cdot (1-\beta) \cdot \cos(2\pi \cdot n/N)}.$$

The estimation variance reduction factor $r_{IIR}$ from input to output samples can be computed using Parseval's theorem as:

$$r_{IIR} = \lim_{N \to \infty} \left\{ \frac{1}{N} \cdot \sum_{n=0}^{N-1} |H(n, \beta)|^2 \right\}.$$

In the limit, the summation can be integrated as:

$$r_{IIR} = \frac{1}{2 \cdot \pi} \cdot \int_0^{2\pi} \left[ \frac{\beta^2}{2 - 2 \cdot \beta + \beta^2 - 2 \cdot (1-\beta) \cdot \cos(\phi)} \right]^2 d\phi.$$

Then $r_{IIR}$ is found as a function of the IIR-filter parameter β after integration.

$$r_{IIR} = \frac{\beta \cdot (2 \cdot \beta - 2 - \beta^2)}{(\beta - 2)^3}.$$

The variance reduction $r_{IIR}$ for AWGN achieved by the IIR filter with β=⅛ is approximately $r_{IIR}$=−14.75 dB.

The filtering across frequency provides another 7 dB in noise reduction for AWGN, as shown previously using the same filter design for â*. The resulting noise-estimation error of only the IIR and frequency filters is then roughly 22 dB better than the variance of a single noise sample input to the filter. This results in a noise-variance estimation error having a standard deviation of about 8% of the filter input noise variance, or equivalently averaging over approximately 150 noise samples. Note that this reduces the noise around the median filter bias, but not the bias itself.

Excess-Noise Feed-Forward Path

In a purely AWGN channel, an optimum receiver would not select the feed-forward excess-noise path, and the optimum noise filter would be linear (e.g., IIR or FIR) and span a long time period. The excess noise path is provided only to handle impulsive-like noise, or coherent reference errors due to switching transients, etc. In these cases the excess-noise path mitigates the occasional effects of large noise bursts without contaminating the longer-term variance estimates provided by the IIR filter. The feed-forward excess-noise path is scaled by G, and a fraction of the noise input samples would exceed the median of the median-filtered path, and these would be selected by the "SELECT MAX INPUT" function in the noise-estimate path. If the scaling is small, then the excess-noise path would be selected less frequently and minimize losses in the AWGN case. The probability that the excess path is selected is approximately equal to the probability that the input noise-squared samples x times gain G exceeds the median.

$$\text{prob}\{\text{excess pathselected}\} =$$
$$\text{prob}\{x \cdot G > \text{median}\} = \text{prob}\left\{x > \frac{\text{mean} \cdot \ln(2)}{G}\right\} =$$
$$\text{prob}\left\{x > \frac{2 \cdot \sigma^2 \cdot \ln(2)}{G}\right\} = \frac{1}{2\sigma^2} \int_{2 \cdot \ln(2)\sigma^2/G}^{\infty} \exp\{-x/2\sigma^2\} \cdot dx =$$
$$2^{-1/G} \text{prob}\{\text{excess pathselected}\} = 2^{-1/G}.$$

The increase in noise-estimation variance due to selecting the excess path is computed as the ratio of the noise contributed by the median path plus the excess-noise contribution, to the median.

$$\text{ratio}(g) = \frac{\text{median}(x) \cdot [1 - \text{prob}\{\text{excess pathselected}\}] + \frac{G}{2 \cdot \sigma^2} \cdot \int_{2 \cdot \ln(2)\sigma^2/G}^{\infty} x \cdot \exp\left\{\frac{-x}{2 \cdot \sigma^2}\right\} \cdot dx}{\text{median}(x)}.$$

Solving some terms, $$\frac{G}{2 \cdot \sigma^2} \cdot \int_{2 \cdot \ln(2) \sigma^2 / G}^{\infty} x \cdot \exp\left\{\frac{-x}{2 \cdot \sigma^2}\right\} \cdot dx = 2 \cdot \sigma^2 \cdot 2^{-1/G} \cdot [G + \ln(2)],$$

and median(x)=mean(x)·ln(2)=2·ln(2)·σ², then substituting yields:

$$\text{ratio}(G) = [1 - 2^{-1/G}] + \frac{2 \cdot \sigma^2 \cdot 2^{-1/G} \cdot [G + \ln(2)]}{2 \cdot \sigma^2 \cdot \ln(2)},$$

simplifying to:

$$\text{ratio}(G) = 1 + \frac{G \cdot 2^{-1/G}}{\ln(2)}.$$

Figure 10:
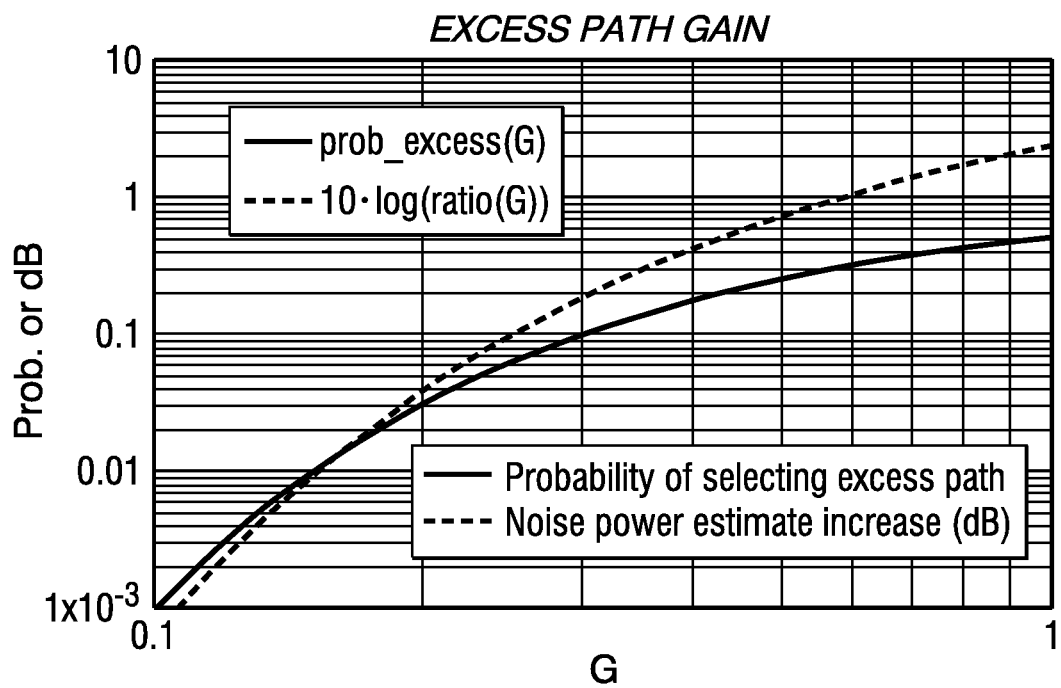
FIG. 10 is a graph of excess path gain.

A plot showing the probability of selecting the excess-noise path and the increase in noise-variance estimate versus the feed-forward excess-noise gain G is shown in FIG. 10. A value of G=0.5 was empirically determined to be a reasonable compromise for the excess-noise gain. This value yields minimal losses in the AWGN case, but is also effective in minimizing losses due to switching transients. Furthermore, the performance with a fast AGC and/or first-adjacent FM interference is improved.

The noise variance increase for G=0.5 is approximately:

ratio(G)=1.18; or 0.72 dB.

Composite Bias Correction

The "composite bias" is the combination of all 3 bias errors initially introduced below and derived in the past few sections. The noise variance bias can be corrected with a factor of ln(2) for the median filter and ratio(G) for the excess-noise path. This SNR-factor correction matters only for the bias offset, since a multiplicative factor is irrelevant to the Viterbi decoding process, where relative metric value is all that matters. The analytical value of r for the CSI-weight $$\frac{\hat{\alpha}^*}{\sigma^2}$$

is then:

$$r_{analytic} = \frac{r_a}{\ln(2) \cdot \text{ratio}(G)}$$

$r_{analytic} = 0.068$; for the preferred values $r_a = 0.056$, $G = 0.5$.

Figure 11:
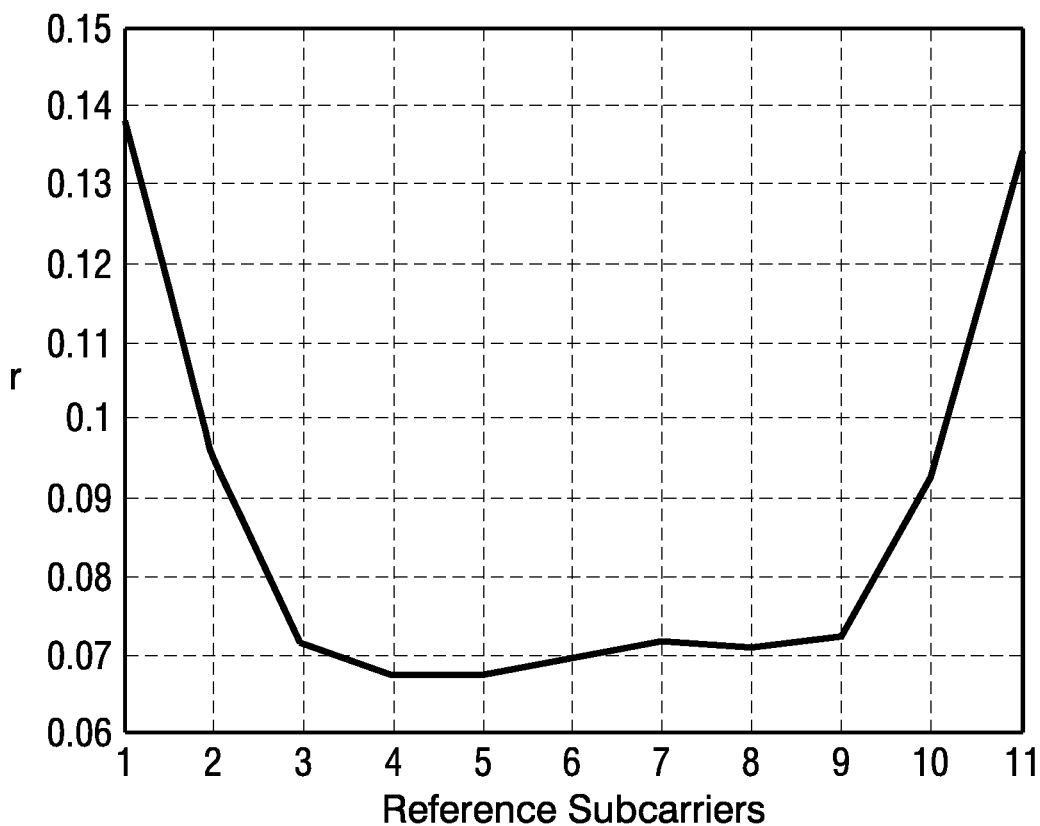
FIG. 11 is a graph of a noise factor.

The analytical value of r was verified through simulation in an actual receiver by measuring $$\frac{|\hat{\alpha}|^2}{\sigma^2}$$

of each reference subcarrier with no signal on one sideband. This value would be used to correct the bias on the SNR estimates for each of the reference subcarriers. FIG. 11 shows the measured values of r from a simulated receiver versus primary main reference sub carrier number.

As shown in FIG. 11, the simulated values of r agree quite closely with the analytical value, except at the outer reference subcarriers. This discrepancy is due to losses caused by filtering at the endpoints. As a result, a practical value of r is chosen slightly greater than $r_{analytic}$. This higher r value may also be useful in suppressing estimation-noise errors at low SNR.

r=0.08.

Next, an expression is derived to correct for this bias. It is convenient if the expression is in the form of a multiplicative factor, so it can be applied to both the SNR and the CSI weight. First, the uncorrected biased SNR is $$\frac{|\hat{\alpha}|^2}{\sigma^2} = \frac{|\alpha|^2 + r \cdot \sigma^2}{\sigma^2}.$$

Then solving for the corrected SNR yields $$\frac{|\alpha|^2}{\sigma^2} = \frac{|\hat{\alpha}|^2}{\sigma^2} - r = \frac{|\hat{\alpha}|^2}{\sigma^2} \cdot \left(1 - r \cdot \frac{\sigma^2}{|\hat{\alpha}|^2}\right).$$

The expression can be shown in the form of the original SNR times a subcarrier warp factor (warpsc), $$\text{warpsc}\left(\frac{|\hat{\alpha}|^2}{\sigma^2}\right) = \max\left(0, 1 - r \cdot \frac{\sigma^2}{|\hat{\alpha}|^2}\right)$$

$$SNR = \frac{|\alpha|^2}{\sigma^2} = \frac{|\hat{\alpha}|^2}{\sigma^2} \cdot \text{warpsc}\left(\frac{|\hat{\alpha}|^2}{\sigma^2}\right); Eb/No.$$

Notice that the expression for warpsc is appropriately limited to positive values. This SNR value equates to Eb/No for the rate-2/5-coded data. The bias of the CSI weight can also be corrected using the same warp factor, $$\text{bit\_metric} = \text{CSI\_weight} \cdot s$$

$$\text{where CSI\_weight} = \frac{\hat{\alpha}^*}{\sigma^2} \cdot \text{warpsc}\left(\frac{|\hat{\alpha}|^2}{\sigma^2}\right)$$

Nonlinear operations previously used to estimate coherent channel complex (conjugate) gain and noise variance, as described in U.S. Pat. No. 7,724,850 B2, are effective in mitigating noise transients, but also introduce bias errors. These estimation bias errors are caused by nonlinear operations (e.g. median filter, excess noise path selection, and noise contamination of signal gain estimate). The method described here compensates for 3 sources of bias errors due to imperfect estimates in the (uncorrected) CSI_weight computation.

Figure 12:
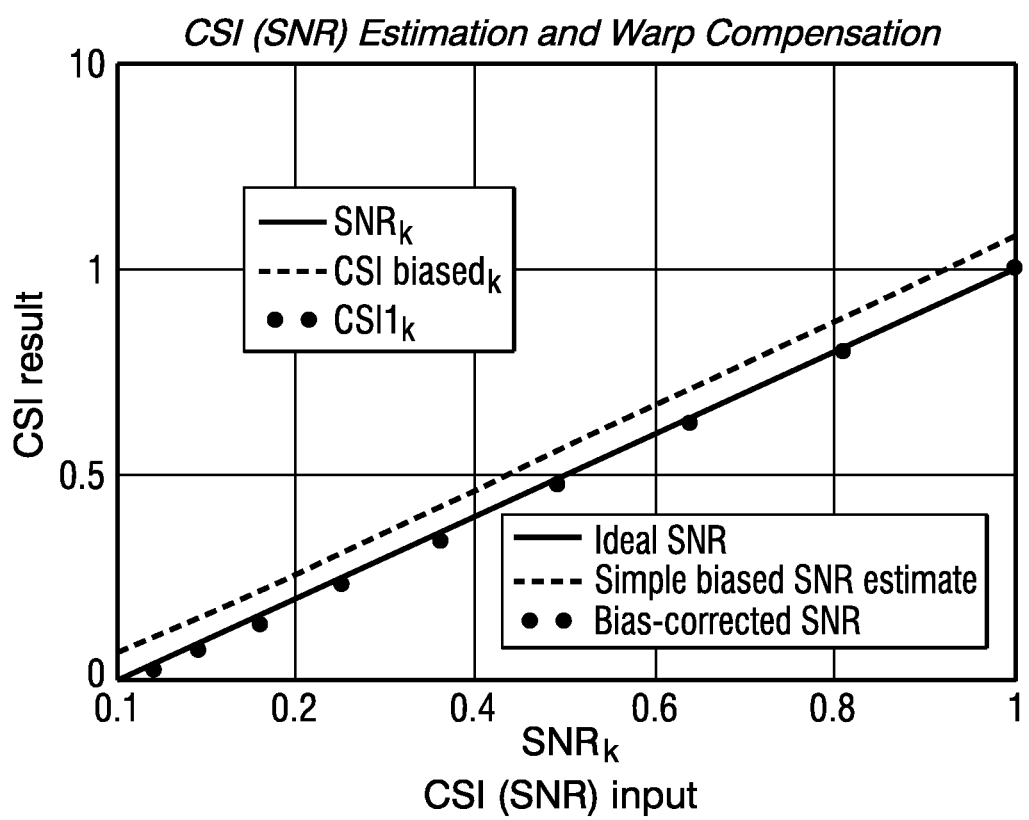
FIG. 12 is a CSI estimation and warp compensation.

Plots of the simple SNR calculation, the bias error, and the bias-corrected SNR are shown in FIG. 12. The plots are a result of a simulation in AWGN using the cascaded median and FIR filters with r=0.08. The individual results were averaged over 10,000 estimations to clearly view the plots. The plots show that the bias-corrected SNR matches closely with the ideal SNR.

Effective SNR

The previously existing technique of estimating the SNR for the entire signal simply involves averaging the squares of the data-subcarrier SNRs over an OFDM symbol. Specifically, the squares of the in-phase and quadrature QPSK components, after CSI-weighting each data symbol of the data subcarriers, are summed every OFDM symbol. This is similar to computing the root-mean-square (RMS) energy ratios of the CSI-weighted soft symbols; however, the reference-subcarrier symbols can be substituted for a better comparison with the improved method described herein.

$$SNRexist(SNRsc) = \sqrt{\frac{\sum_{k=0}^{21} SNRsc_k^2}{22}}.$$

The logarithm of this SNR result is converted into Cd/No (dB-Hz) after multiplication by an appropriate factor and addition of an appropriate dB offset. The result is intended to represent the digital carrier-to-noise-density ratio (Cd/No dB-Hz) over all the subcarriers. However, this SNR estimate is accurate only when all the subcarriers have approximately the same SNR. Moreover, the estimation does not even measure the average SNR because the squares of the individual subcarriers are averaged. The average SNR would be estimated if the absolute values of the subcarrier SNRs were used instead of their squares.

Therefore a goal for an improved technique for estimating the signal quality is to define an estimation technique that yields an accurate average SNR when the SNR is uniform over all subcarriers in AWGN. When the subcarrier SNRs are non-uniform, then the estimated overall SNR should be less than the average, accounting for coding gain loss.

Instead of simply averaging the reference-subcarrier SNRs, the "effective" SNR could include the effects of coding-gain loss by subtracting an approximation of the standard deviation of the reference-subcarrier SNRs from the average of the SNR over all the reference subcarriers. This technique and some variations of it were analyzed, simulated, and evaluated. As a result, a technique for estimating effective SNR (or Cd/No) is presented.

Figure 13:
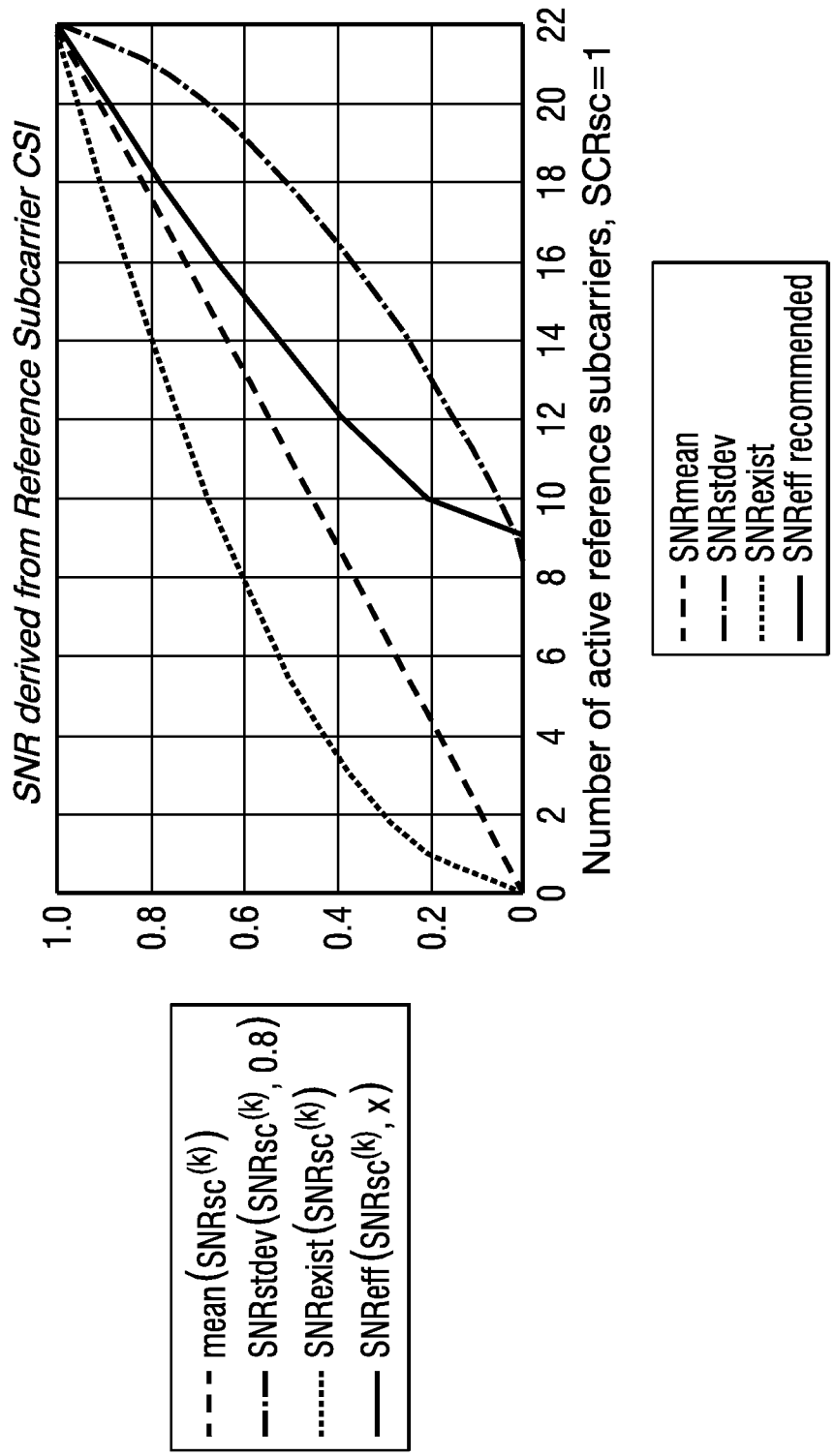
FIG. 13 is a graph of SNR derived from reference subcarrier CSI.

FIG. 13 plots several SNR estimates when a variable number of reference subcarriers are zeroed. The 22 Primary Main reference subcarriers (e.g., MP1) are used in the estimate, where the active reference subcarriers are assigned an SNR of 1, and the others are zero. The plots show that when all 22 reference subcarriers are active, then the overall SNR estimates are all 1, as expected. As the number of active reference subcarriers varies from 0 to 22, the overall SNR estimates range from 0 to 1, also as expected.

There are 11 reference subcarriers on each sideband bounding 10 code-bit partitions, where the code bits are carefully selected from a 20-bit puncture pattern to improve decoding performance in the most likely interference scenarios. Since a rate-2/5 FEC code is used, the signal is not decodable when fewer than 8 partitions remain, resulting in a code rate greater than 1.

The previously existing SNR estimation (dotted line) computes the RMS value of SNRs of all the data-bearing subcarriers. The previously existing method is accurate only when all the subcarriers have the same SNR. The SNR estimation error is large when there are fewer than 9 active reference subcarriers because the effective SNR should be zero.

The mean overall SNR plot (dashed line) increases linearly with the number of active subcarriers, of course. Although the estimation error is less than the existing method, it still has the same problem when there are fewer than 9 active reference subcarriers.

One simple expression for the effective SNR is established by subtracting the standard deviation from the mean of the SNRs of the 22 reference subcarriers (SNRsc). The parameter x can be adjusted to zero the SNR estimate when there are fewer than 9 active reference subcarriers.

$SNRstdev(SNRsc,x)=\max\{0,\text{mean}[SNRsc-x\cdot stdev(SNRsc)]\}$; recommend $x=0.8$.

However, this does not provide a good estimate of the effective SNR when a full sideband is active. The curve should be more convex. A better estimate of the effective SNR is the following expression:

$$SNReff(SNRsc, x) = \sqrt{\frac{1}{22\cdot\sqrt{22}-22\cdot x} \cdot \sqrt{\max\left\{0, \sqrt{\sum_{k=0}^{21}SNRsc_k^2}\cdot\sum_{k=0}^{21}SNRsc_k - x\cdot\sum_{k=0}^{21}SNRsc_k^2\right\}}}.$$

This provides a better estimate while more appropriately accounting for coding-gain loss. So this expression is recommended for estimating the effective SNR of the overall digital signal. This SNR result is approximately in units of Eb/No for the rate-2/5 code. Substitution of the preferred value of x=3 yields:

$$SNReff(SNRsc) = \sqrt{0.027\cdot\max\left\{0, \sqrt{\sum_{k=0}^{21}SNRsc_k^2}\cdot\sum_{k=0}^{21}SNRsc_k - 3\cdot\sum_{k=0}^{21}SNRsc_k^2\right\}}.$$

An estimate of the effective carrier-to-noise-density ratio can be derived from SNReff, which is an estimate of Eb/No.

$Cd/No=bps\cdot Eb/No\approx 100000\cdot SNReff$, where bps is the information throughput (100 kbps) of the P1 logical channel with r=2/5 convolutional coding. Cd/No is represented in dB-Hz as:

dB_Hz=10·log {SNReff(SNRsc)+0.1}+50 where the 0.1 term is added to prevent a result of negative infinity.

Although using only reference subcarriers to determine the effective SNR provides accurate results and limits processing requirements, the individual SNR estimates produced for every symbol can be somewhat noisy. These values could be filtered over time to reduce the noise and smooth the result; alternatively, the noise could be reduced if data subcarriers were used in addition to the reference subcarriers.

The previously existing technique for calculating SNR (and Cd/No) estimates is deficient for a number of reasons—primarily because it is accurate only when all subcarriers have approximately the same SNR. Although existing Cd/No estimates are reliable in a purely AWGN environment, they break down in selective fading and interference typically encountered in a mobile environment. A new method is described that, instead of simply averaging the reference-subcarrier SNRs, includes the effects of coding-gain loss by subtracting an approximation of the standard deviation.

The improved technique for estimating SNR and Cd/No should be far more reliable in typical mobile environments, and should require less processing since it uses only the reference subcarriers. As Cd/No is the primary metric in improved blending algorithms (such as blend decision), implementation of this algorithm could prove critical to further enhancing the listener experience. The improved SNR metric can also be used to replace the digital signal quality metric (DSQM-Lite) for diversity switching and channel scanning, enhancing reliability and reducing processor throughput.

The various signal-processing methods described above can be implemented in a radio receiver or other apparatus having an input for receiving the radio signal and one or more processors or other processing circuitry configured to perform the signal processing needed to implement the processes.

While the present invention has been described in terms of several embodiments, it will be understood by those skilled in the art that various modifications can be made to the disclosed embodiments without departing from the scope of the invention as set forth in the claims.

What is claimed is:

1. A method for estimating channel state information in an in-band on-channel radio signal including a plurality of digitally modulated reference subcarriers, the method comprising:
   receiving symbols transmitted on the reference subcarriers;
   combining the reference subcarrier symbols with a known reference sequence conjugate to produce a plurality of samples;
   median filtering the samples to produce filtered samples;
   smoothing the filtered samples for each of the reference subcarriers over the plurality of reference subcarriers to produce a complex channel gain estimate for each of the subcarriers; and
   using a bias correction function to compensate for estimation bias error in the complex channel gain estimate due to the median filtering.

2. The method of claim 1, wherein the bias correction function includes a noise variance bias correction component.

3. The method of claim 1, further comprising:
   using the plurality of samples and the complex channel gain estimate for each of the subcarriers to produce noise squared samples;
   filtering the noise squared samples to produce a noise variance estimate;
   selecting between the noise squared samples and the noise variance estimate to determine a selected noise variance estimate;
   smoothing the selected noise variance estimate for each of the reference subcarriers over the plurality of reference subcarriers to produce a noise variance estimate for each of the subcarriers; and
   compensating for bias error in the noise variance estimate.

4. The method of claim 3, wherein the step of compensating for bias error in the noise variance estimate compensates for bias error due to the step of nonlinear processing of the noise squared samples.

5. The method of claim 4, wherein the step of compensating for bias error in the noise variance estimate compensates for the median filter bias error in the noise squared samples.

6. The method of claim 3, wherein the step of compensating for bias error in the noise variance estimate compensates for the excess noise feedforward nonlinear bias error in the noise variance estimate.

7. The method of claim 1, wherein the bias correction function comprises a multiplicative factor compensation function.

8. The method of claim 1, further comprising:
   estimating an effective signal-to-noise ratio of the in-band on-channel radio signal by averaging the signal-to-noise ratios of the reference subcarriers in the in-band on-channel radio signal and subtracting an approximation of a standard deviation of the signal-to-noise ratios of the reference subcarriers.

9. The method of claim 8, further comprising:
   using the effective signal-to-noise ratio to derive an effective carrier-to-noise density ratio.

10. The method of claim 1, wherein data subcarriers were used in addition to the reference subcarriers.

11. A receiver for an in-band on-channel radio signal including a plurality of digitally modulated reference subcarriers, the receiver comprising:
    an input for receiving symbols transmitted on the reference subcarriers; and
    processing circuitry for estimating channel state information, the processing circuitry being configured to combine the reference subcarrier symbols with a known reference sequence conjugate to produce a plurality of samples; median filter the samples to produce filtered samples; smooth the filtered samples for each of the reference subcarriers over the plurality of reference subcarriers to produce a complex channel gain estimate for each of the subcarriers; and use a bias correction function to compensate for estimation bias error in the complex channel gain estimate due to the median filtering.

12. The receiver of claim 11, wherein the bias correction function includes a noise variance component.

13. The receiver of claim 11, wherein the processing circuitry is further configured to use the plurality of samples and the complex channel gain estimate for each of the subcarriers to produce noise squared samples; filter the noise squared samples to produce a noise variance estimate; select between the noise variance estimate and the noise squared samples to determine a selected noise variance estimate; smooth the selected noise variance estimate for each of the reference subcarriers over the plurality of reference subcarriers to produce a noise variance estimate for each of the subcarriers; and compensate for bias error in the noise variance estimate.

14. The receiver of claim 13, wherein the processing circuitry is further configured to compensate for bias error in the noise variance estimate by compensating for bias error due to the step of filtering the noise squared samples.

15. The receiver of claim 14, wherein processing circuitry is further configured to compensate for bias error in the noise variance estimate by compensating for bias error in the noise variance estimate.

16. The receiver of claim 13, wherein the processing circuitry is further configured to compensate for bias error in the noise variance estimate by compensating for bias error in the noise variance estimate.

17. The receiver of claim 11, wherein the bias correction function comprises a multiplicative factor compensation function.

18. The receiver of claim 11, wherein the processing circuitry is further configured to estimate an effective signal-to-noise ratio of the in-band on-channel radio signal by averaging signal-to-noise ratios of reference subcarriers in the in-band on-channel radio signal and subtracting an approximation of a standard deviation of the signal-to-noise ratios of the reference subcarriers.

19. The receiver of claim 18, wherein the processing circuitry is further configured to use the effective signal-to-noise ratio to derive an effective carrier-to-noise density ratio.

20. The receiver of claim 11, wherein data subcarriers were used in addition to the reference subcarriers.

* * * * *